United States Patent [19]

Weber

[11] 4,255,710

[45] Mar. 10, 1981

[54] PLURAL SEARCH FREQUENCY DIRECTIONAL METAL DETECTOR APPARATUS HAVING ENHANCED SENSITIVITY

[76] Inventor: Harold J. Weber, 20 Whitney Dr., Sherborn, Mass. 01770

[21] Appl. No.: 907,673

[22] Filed: May 19, 1978

[51] Int. Cl.³ .................... G01V 3/11; G01V 3/165; H03B 1/00
[52] U.S. Cl. ...................................... 324/328; 331/38
[58] Field of Search ............... 324/3, 5, 67, 236, 79 R, 324/52, 328; 331/37, 38, 39, 64, 65; 340/551

[56] References Cited

U.S. PATENT DOCUMENTS

| | | | |
|---|---|---|---|
| 2,380,288 | 7/1945 | Bligh et al. | 331/38 X |
| 2,393,717 | 1/1946 | Speaker | 324/3 |
| 2,445,664 | 7/1948 | Doelz | 331/38 |
| 2,627,033 | 1/1953 | Jensen et al. | 331/38 X |
| 2,666,141 | 1/1954 | Clapp et al. | 331/38 |
| 2,731,598 | 1/1956 | Herbert | 324/52 |
| 3,492,564 | 1/1970 | Baker | 324/3 |
| 3,519,929 | 7/1970 | Ault | 324/79 R |
| 3,769,575 | 10/1973 | Rist et al. | 324/3 |
| 3,823,365 | 7/1974 | Anderson | 331/37 X |
| 3,986,104 | 10/1976 | Randolph | 324/3 |

FOREIGN PATENT DOCUMENTS 1056768 1/1967 United Kingdom ............... 324/67

*Primary Examiner*—Gerard R. Strecker

[57] ABSTRACT

A directional concealed object locator, say metal detector, employing a beat frequency oscillator and at least two search oscillators. The search oscillators each include a loop antenna which in part serves to determine the search frequency signal rate of each oscillator and functionally serves to produce an electromagnetic field of relatively large proportions from each loop antenna which is portably so orientable as to have the extended electromagnetic field lines, which emanate from each loop antenna, separately coupled to a buried, or otherwise obscured metal object and thereby produce changes in the search signal rate as the proximity therebetween is varied. The common beat oscillator produces a signal so related to each search frequency signal as to be conjointed in a heterodyne detector and therefrom produce at least two audio frequency notes the resultant periodicities of which are proportional to the difference between each of the search frequency signal rates and the common beat oscillator signal rate. Further improvement is provided in that each resultant audio frequency difference rate is aggrandized so as to change at a rate, in hertz, which is far in excess of any change, in hertz, directly produced in each search fundamental frequency signal by varied object proximateness. The effect is to cause an apparent increased sensitivity, which is shown in one form so as to be variable, in the operation of the metal detector, while at the same time providing proximal resolution by way of a left-hand, or else right-hand, indication of the hidden object transversal path.

11 Claims, 14 Drawing Figures

PLURAL SEARCH FREQUENCY DIRECTIONAL METAL DETECTOR APPARATUS HAVING ENHANCED SENSITIVITY

SUMMARY OF INVENTION

The instant invention relates to improvement in the sensitivity of the ability for a beat frequency, say BFO, type metal detector to respond to a covert object. The usual, known BFO detectors operate with two high frequency oscillators one of which is usually offset in frequency from the other by a small, usually low audio, frequency amount. One oscillator, say search oscillator, includes a rather large loop antenna the inductance of which comprises at least part of the frequency determining circuitry associated with the said search oscillator. The loop antenna accordingly emanates a rather large electromagnetic field, the individual lines of which may, through portable movement of the device, be caused to intercept a concealed object, say metal object. The result is the object will act upon the coupling field lines so as to influence a change in the loop antenna inductance and thereby the search oscillator frequency. The second oscillator, say beat oscillator, provides a rather stable signal which is mixed with the search oscillator signal in a heterodyne detector thereby producing an audio frequency output which varies in accordance with any shift, or deviation, in the search frequency caused by the covert object. Whilst this method has been utilized to mankind's benefit for locating everything, so to speak, from buried treasures, concealed pipes, and lost coins, to that of spotting secreted antipersonnel mines, the detection sensitivity has always been a tradeoff between several factors, not the least of which are frequency of the search oscillator, loop antenna size, and sacrifice of search frequency drift due to less than obtimum, i.e., high "L", tuned circuits. Furthermore, once the general presence of an object is sensed, these earlier known locators do not guide the operator, say to the right or the left, so as to more quickly, and sometimes more safely, spot the find.

I have discovered, however, that a synergetic improvement in the localization ability of the metal locator may be brought about through the use of two or more search oscillators with each coupled to an individual loop antenna. Each antennae is mounted so as to interact with an object from a different angle, with the resulting combination of effects serving to produce a search frequency signal from each search frequency oscillator which differs in accord with the positional relationship between the individual loop antenna elements and the object. Each of the several, usually different, search frequency signals serve to combine, as in a heterodyne detector, with a common beat oscillator signal. The result is at least two effectively separate difference frequency signals, usually at an audio frequency rate, which will serve to convey a distinctive indicative signal to the operator as to the bearing relationship between the operator and the sought object.

The use of a low search frequencies is advantageous to get good earth concealed, and in particular aquatic, search penetration. For example, a frequency of, say, 35-kilohertz can be expected, in the usual case, to obtain far greater covert medium penetration than what a higher, say 455-kilohertz, signal might obtain. The drawback, in the usual application, of the lower frequency is that an object will, with all other factors being similar, produce substantially less frequency deviation in hertz than what may be produced by a higher search frequency.

I have further discovered that if I use a low search frequency and produce therefrom a series of higher order harmonics, one of the harmonics may be utilized to heterodyne with a beat frequency which is substantially higher than the fundamental search frequency. Since the frequency deviation of the harmonic will vary in accordance with the fundamental search frequency deviation, produced by the covert object, times the harmonic order, or multiple, the result is the combinative heterodyned audio frequency will change at a rate, in hertz, far in excess of the change produced in the fundamental search frequency by the covert object. The suprising effect from such novel combinative means is that I can:

a. provide a directional, say right hand or left hand, bearing indication as to the proximal lay of the sought object;

b. obtain deeper covert medium penetration due to the use of a substantially lower fundamental search frequency;

c. obtain improved beat frequency audio response from smaller, or else more deeply concealed, metal objects; and d. reduce so called "ground proximity" effects due to lower frequency operation and higher "C" tank circuits associated with the search oscillator.

The improvement I have provided results in a metal locator of superior directional sensibility, sensitivity and stability thereby producing performance results heretofore difficult to come by.

DESCRIPTION OF INVENTION

Figure 1:
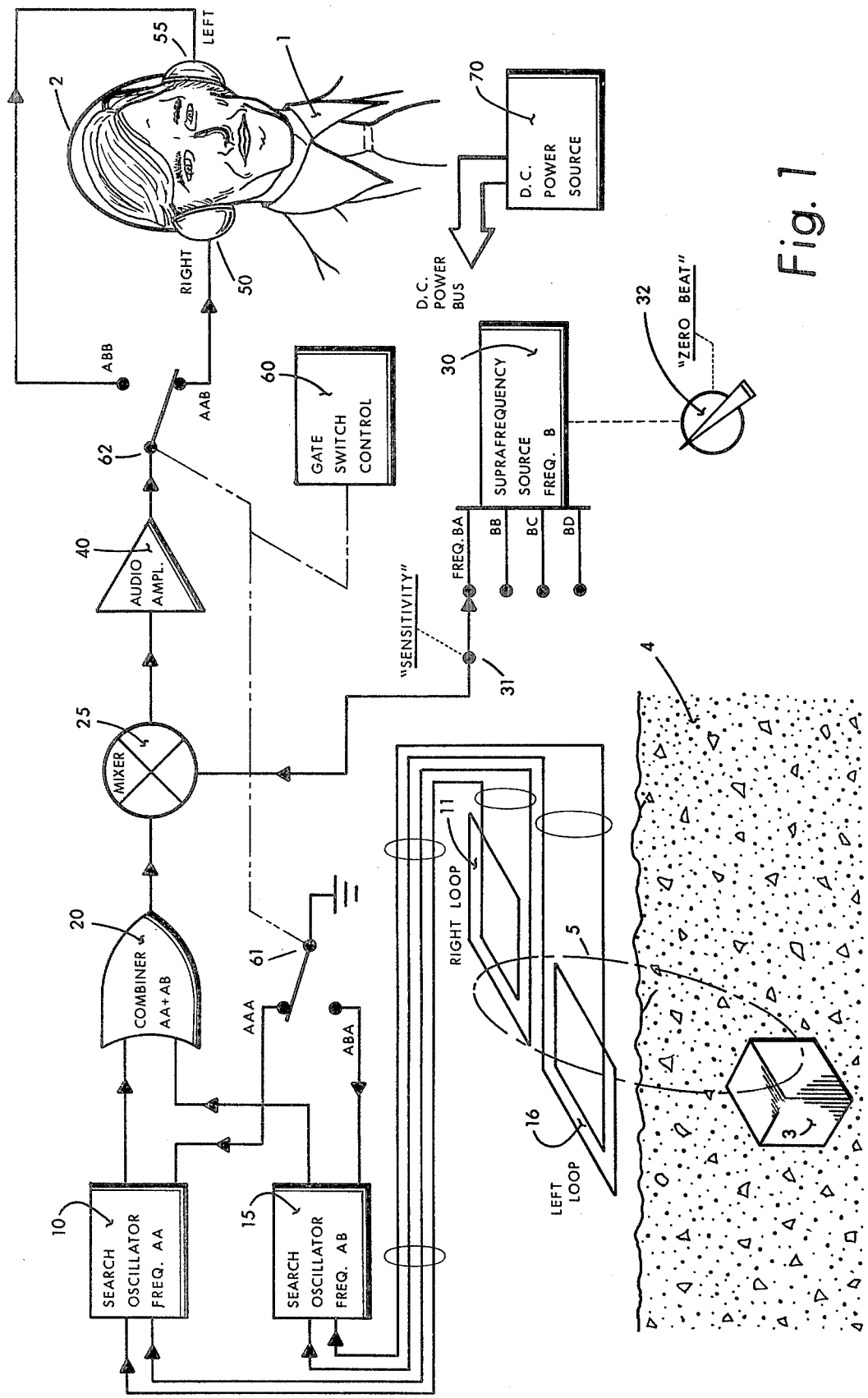
FIG. 1—Functional block diagram showing a source of suprafrequency signal which serves to combine with the higher order harmonics of the search oscillators in a mixer for purpose of providing a stereotonic detector signal to the operator which includes beat frequency aggrandizement.

FIG. 1 gives illustration to one form for my instant invention. The metal locator is shown as a multichannel, say stereotonic, detector employing two loop antennae 11, 16 together with separate search oscillators 10, 15 which are alternatively enabled by switch means 61. This is to say, when switch 61 is in position AAA, search oscillator 10 for frequency AA will operate, whereas when switch 61 is in position ABA, search oscillator 15 for frequency AB will operate. The alternate search oscillator outputs are combined 20 so as to couple therefrom to a mixer 25 first input port. Operation of the search oscillators, in cooperation with the loop antennae, are such that the field lines 5 extending from the respective loops 11, 16 will effectually intercept a concealed object 3 which is obscured, as in soil 4. This multiple loop interaction is a key part of the novelty of the invention and is the part of the apparatus which provides directionality and bearing indication to the operator. The result is the magnetic properties, say inductance, of the individual loops will be caused to change albeit ever so slight from their nominal properties to some new inductance value which is principally proportional to the coupling between either loop 11, 16 and the object 3. As is depicted in the figure, one loop, say 11, acts as a "right" loop, whereas the other loop 16 acts as a "left" loop. This is to say, the off-axis alignment of the loops will cause either one loop or the other to respond by a greater extent to the object when the object lies favorably either to the right or the left of the detector antennae means. The alignment of the antennae means so each the right and the left loop are equidistant from the object will give orientation to the operator as to the general bearing of the object relative to the detector. Moving in the correct bearing direction will then produce a maximum and about equal effect on the antennae inductance values and accordingly, on the resultant search signal frequency. The result is an independent change in the search oscillator 10 frequency AA and the search oscillator 15 frequency AB, as applied to the mixer 25 first input port. The mixer 25 second input port is coupled 31 to a source of frequency B signal. The frequency B is somewhat different from either the frequency AA or AB nominal periodicities. The result is that, through heterodyne detection or mixing action, the output port of mixer 25 will include audio frequency components which are the difference between frequency AA and frequency B, or else frequency AB and frequency B in an alternate fashion. An audio amplifier 40 serves to feed the composite audio signal to switch 62 which, by action of the gate switch control 60, acts to connect the AAB output to the right earphone 50 when the oscillator 10 is enabled and, conversely, connect the ABB output to the left earphone 55 when the oscillator 15 is enabled. Thereby the operator 1 is provided with a left or right hand sensory indication of the proximate relationship of the inducers 11, 16 to the object 3.

For good penetration of covert mediums as, say, soil or the like and, most especially, water, the operating frequencies for the loop antennae are best kept relatively low, say on the order of 50-kilohertz or less. On the other hand, the lower frequency does not deviate as much in frequency when the loop is in the presence of an object. This is to say that, while the deviation percentage is about the same as what a higher search frequency might present, the absolute value, in hertz, is less. Since in a beat frequency detector, it is the absolute frequency change which reflects in the output, the usual practice in the art is to employ detectors operating at several hundred kilohertz to assure a useful frequency shift which may be readily recognized by an operator.

The directional tracing ability of my instant invention is further enhanced through the use of a suprafrequency source for frequency B which provides one or more outputs which are integral multiples of the nominal search oscillator 10, 15 frequencies AA, AB. For example, if the source 30 contains an oscillator for frequency B, which may be somewhat varied by "zero beat" control 32, from which several outputs BA, BB, BC, BD are provided, the operator may select by means of a "sensitivity" control 31 between any of several rates of hetrodyne sensitivity in the detector. This is to say, if the nominal search oscillator frequencies are about 50-kilohertz, the suprafrequency BA may be shown to be about 50-kilohertz, BB to be about 100-kilohertz, BC to be about 150-kilohertz, and suprafrequency BD to be about 200-kilohertz. With the sensitivity switch 31 in position BA, a change of, say, 300 hertz in the search oscillator frequency will result in a 300 hertz shift in the mixer output audio tone. On the other hand, with the sensitivity switch in position BD, the exampled 200-kilohertz suprafrequency at the mixer 25 second input port will serve to principally hetrodyne with the search frequency fourth harmonic appearing at the mixer 25 first input port. The result will be a four-fold increase in sensitivity, i.e., the effect on the loop antenna which, as earlier stated, only produced a 300 hertz audio note shift, will now cause a 1,200 hertz shift. Said another way, to produce a 300 hertz shift, the object will need only exhibit one-fourth the effect on the loop antenna as before. A source of d.c. power 70 supplies all the active oscillators, amplifiers, and control functions in the locator.

Figure 2:
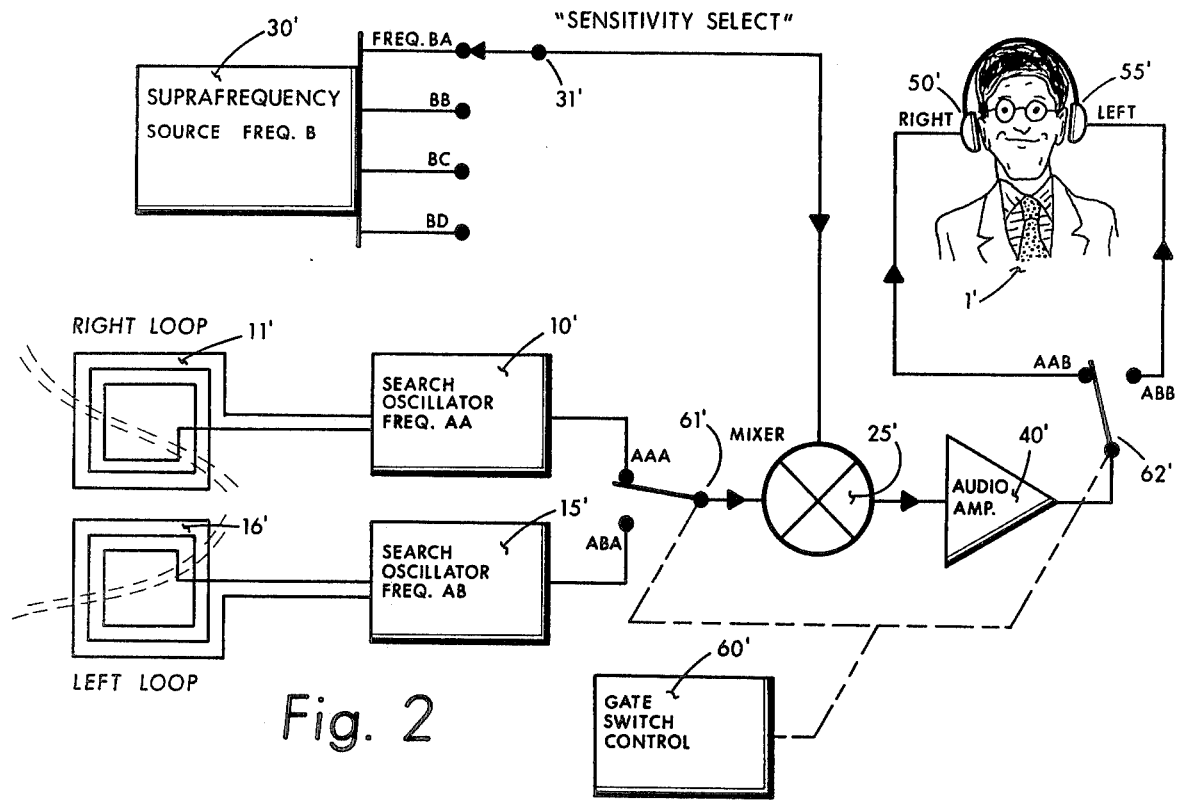
FIG. 2—Block diagram showing the use of a suprafrequency source in conjunction with two search oscillators which are switched between so as to produce a stereotonic indication to the operator.

Yet another embodiment arrangement is depicted in FIG. 2 whereby the outputs from each search oscillator 11', 16' are alternately selected by a switch means 61', then coupled to the input port of mixer 25'. The phasing is such that when the switch 61' is in position AAA, the output from the RIGHT search oscillator frequency AA will couple into the mixer 61' and heterodyne with the suprafrequency beat signal BA so as to produce at least a difference signal which is amplified 40' and coupled by way of a switch 62' in position AAB to the RIGHT earphone 50' worn by the operator. In rapid alternate succession, switch 61' also connects to position ABA thereby coupling the LEFT search signal AB into the mixer resulting in a difference signal which is amplified 40' and coupled through position ABB of switch 62' to the LEFT earphone 55'. The gate switch control generates the switching signal required to actuate switches 61', 62' usually at a rate of at least several hertz. In this connection, search oscillators 11', 16' may run continuously, but better practice of the invention (due to problems produced by frequency pulling, etc. by coaction between the oscillators) is to alternately gate the oscillators ON and OFF by way of a switch means synchronized with switch 61'.

Figure 3:
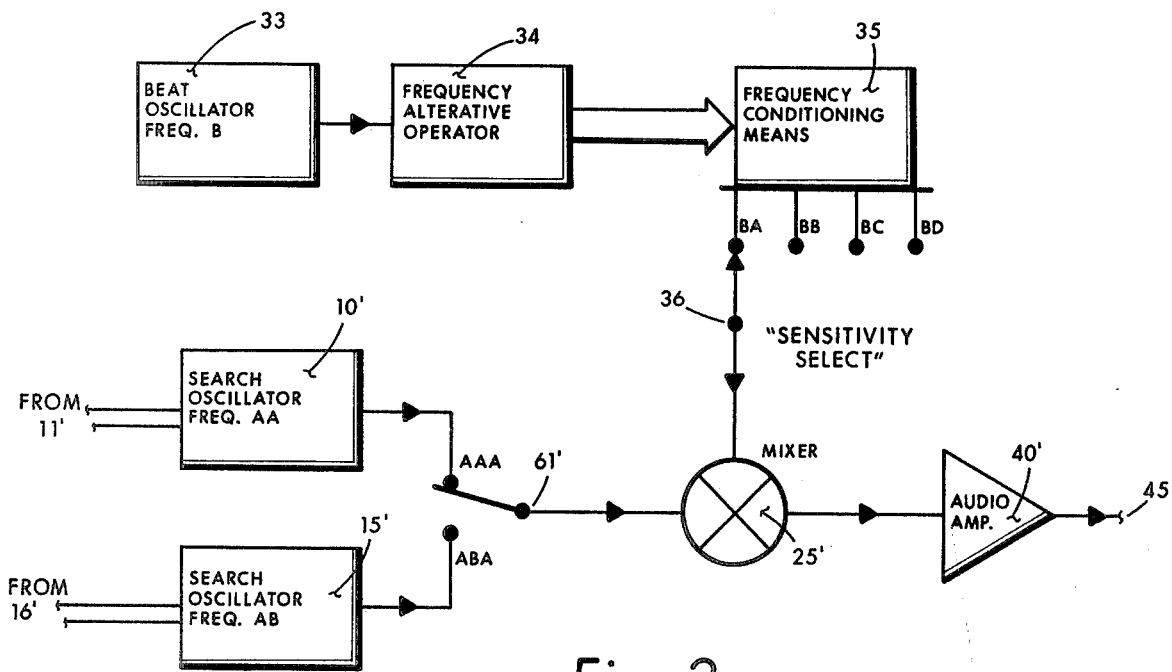
FIG. 3—Block diagram showing the suprafrequency source to include a beat oscillator, a frequency alternative operator, and a frequency conditioning means.

FIG. 3 shows the suprafrequency source to include a beat oscillator 33 operating at frequency B, a frequency alternative operative 34, and a frequency conditioning means 35, in conjunction with a "sensitivity select" switch 36. As shown, the operator 34 is a frequency multiplier, or else divider, means which serves to produce at least one output therefrom which is integrally higher than the search frequency A. The operator cooperates with a conditioning means to provide at least one integral frequency output to the switch 36 or like means. The resulting signal couples to mixer 25', while the rest of the locator detail is like that shown for FIG. 1 or FIG. 2.

Figure 4:
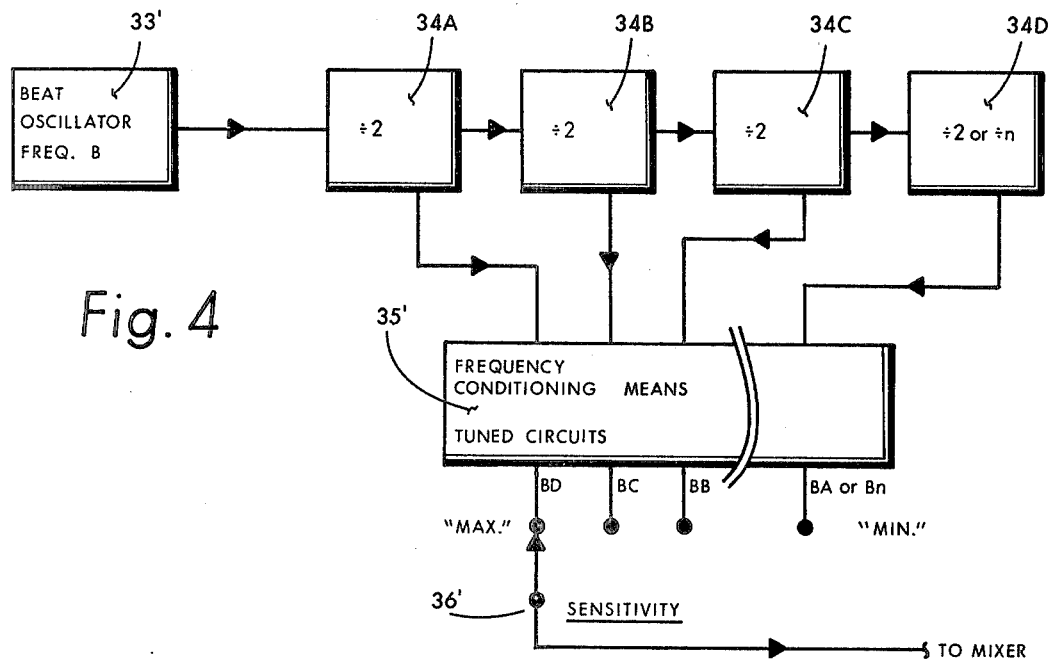
FIG. 4—Block diagram showing the suprafrequency source including a beat oscillator operating at a relatively high frequency which is altered, or divided down, by one or more divide-by-two functions, including a tuned circuit frequency conditioning means for each resultant subfrequency.

FIG. 4 shows the beat oscillator 33' serving as the clock signal source for a succession of divide-by-two binary counters 34A, 34B, 34C, 34D. As shown, the beat oscillator frequency B would likely be sixteen times the search frequency A, whilst output frequency BD is 8X frequency A, frequency BC is 4X frequency A, frequency BB is 2X frequency A, and frequency BA is 1X frequency A. The frequency conditioning means 35' typically consists of a tuned circuit, say coil and capacitor, for each frequency which serve to maximize the output amplitude at each particular output frequency.

Figure 5:
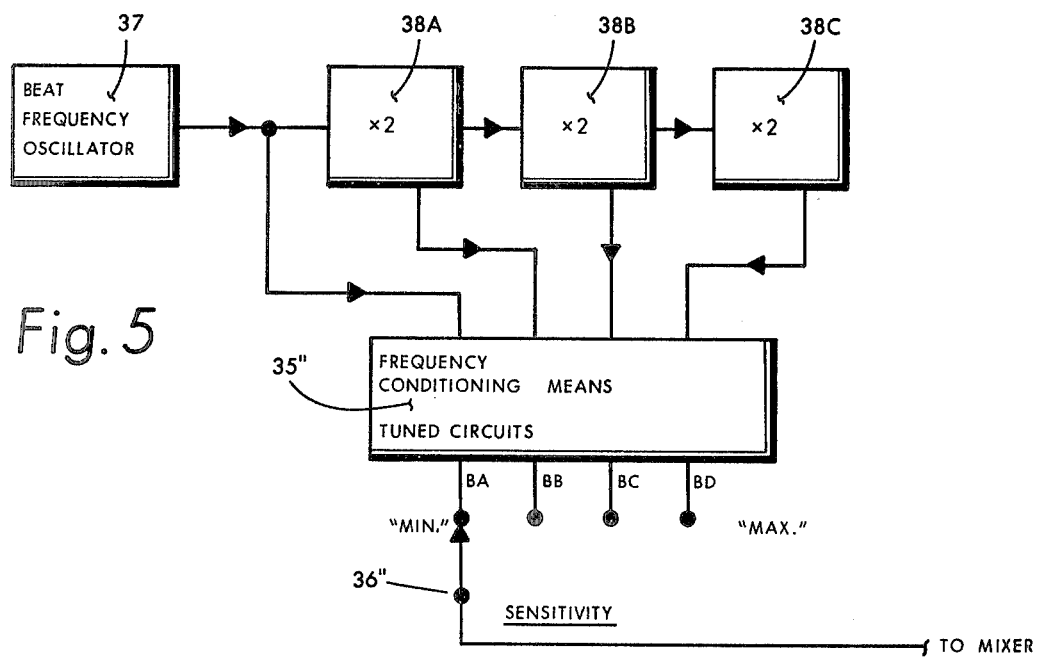
FIG. 5—Block diagram showing the suprafrequency source including a beat oscillator operating about the same frequency as the search oscillator wherein, further, the frequency is multiplied up to one or more higher order suprafrequencies.

FIG. 5 shows a means which is an alternative to that shown for FIG. 4. The beat oscillator 37, typically operating near the same frequency as the search oscillator, serves to drive a succession of frequency multiplier means 38A, 38B, 38C which, in the shown example, provide respective outputs at 2X, 4X, and 8X the search frequency.

Figure 6:
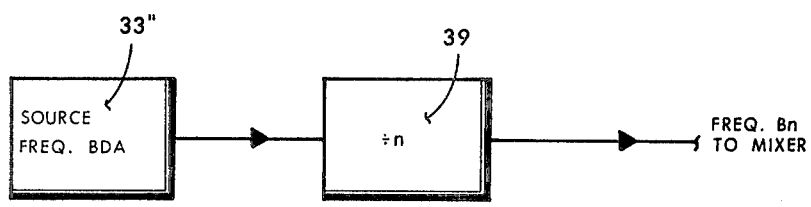
FIG. 6—Block diagram for an "economy" suprafrequency source including a beat frequency source and a single divide-by-"n" operator with one, non-selectable, output.

FIG. 6 shows the implementation of my novel invention in form suited for inexpensive, or else fixed application, detector apparatus. In this usage, an oscillator 33'' operates at frequency BDA, say several times frequency A, with the output serving to drive a "÷n" stage 39 wherein, of course, "n" can include any integral number including 1, but most commonly being 2, 4, 8 and so on. In this example only one fixed output is shown.

Figure 7:
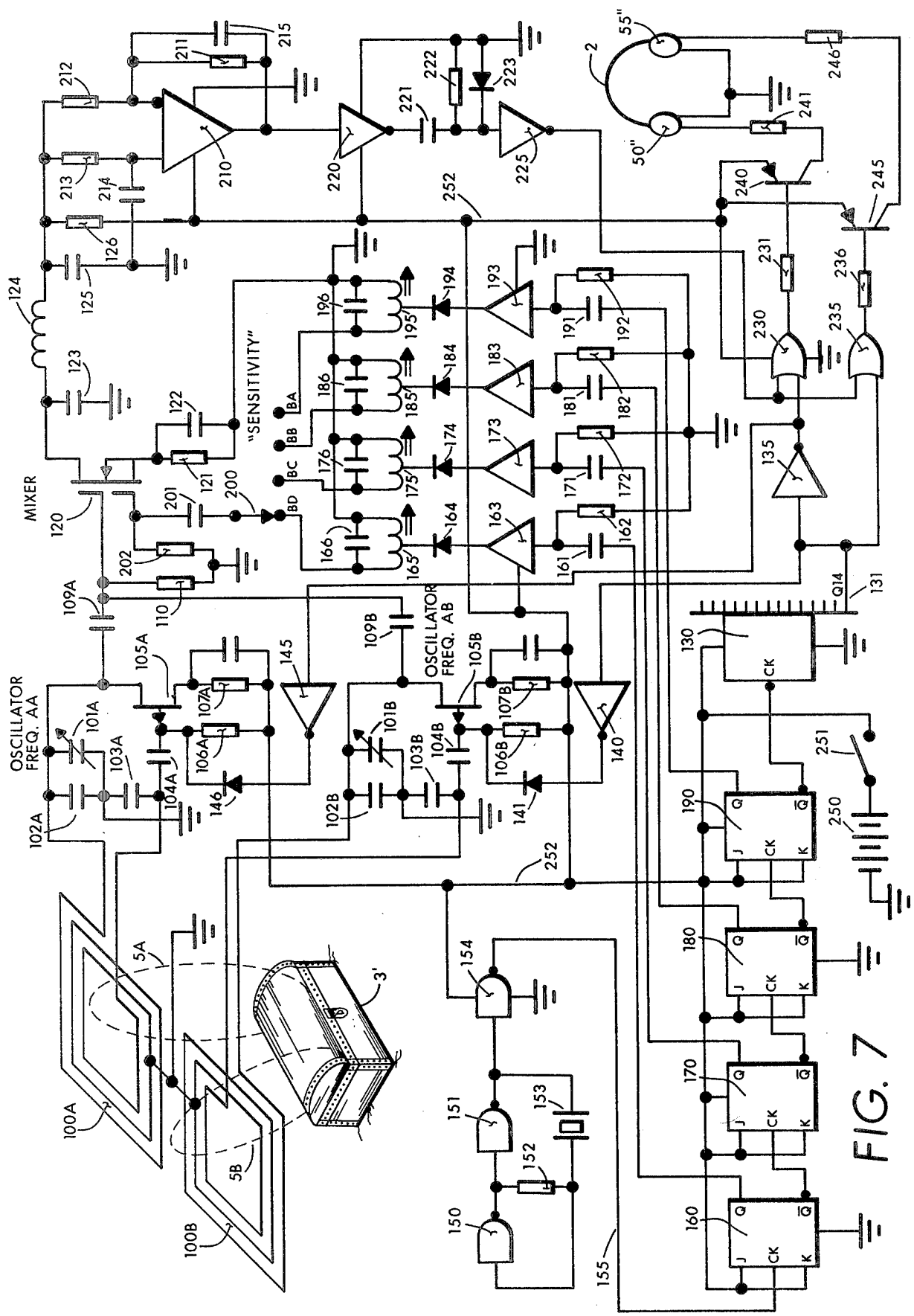
FIG. 7—Schematic for a preferred embodiment for a stereotonic metal detector employing a pair of search oscillators together with a stable beat frequency signal source including several divider stages to effect the selectability of more than one suprafrequency to enable a change in sensitivity.

FIG. 7 is the schematic for the preferred embodiment of a bitonic metal detector incorporating the improvements found in my instant invention. Search loop 100A combines with field effect transistor 105A, say 2N4360, resonating capacitors 101A, 102A, 103A, gate capacitor 104A, gate leak 106A, source resistor 107A including bypass to form a first search oscillator the first search signal instantaneous frequency rate of which is determined, in part, by the proximity of the loop 100A to any conductive, say metal, object.

A second search loop 100B combines with field effect transistor 105B; resonating capacitors 101B, 102B, 103B; gate capacitor 104B; gate leak resistor 106B; source resistor 107B including bypass, and together act to form a second search oscillator the second search signal frequency rate of which is determined, in part, by the proximity of the loop 100B to any conductive, say metal, object.

Since the first loop 100A and the second loop 100B are axially offset relative to one-another, the result is that either one loop or the other will be more affected by the presence of a metal object 3' except in one position: that being when the two loops are in a relatively balanced position proximate with the buriment. Operation is such that, with the usual kind of metallic object with magnetic properties such as iron or the like, the oscillator frequency for the nearer loop will usually be lower than that from the farther loop (assuming initial balance for both search oscillators at the same frequency). When both loops are evenly disposed about a line which is substantially on-axis with the object lay, the frequencies will be about equal and will usually decrease in value as the buriment is approached. Therefore what the invention provides for the operator is:

a. presence of the object by a change in one or both search oscillator frequencies;

b. bearing of the object by bringing both search oscillators into periodicity coincidence; and, c. exact spotting of the object by following the bearing along which both search oscillators change by an about equal and a maximum amount.

A beat frequency oscillator for frequency B operates, in this example, near 880-kilohertz. The oscillator consists of inverters 150, 151, say CD4069, including resistor 152 and preferably quartz crystal or the like 153. The oscillator drives, through inverter 154, a succession of divide-by-two counters 160, 170, 180, 190, say CD4027, which individually serve to drive buffers 163, 173, 183, 193, say CD4050, including coupling capacitors 161, 171, 181, 191 and resistors, typified by 162, 172, 182, 192. The values of the capacitors and resistors, for example 161, 162 are such as to serve so as to differentiate the individual signal frequencies delivered by each divider stage, thereby resulting in an output from each inverter the duration of which may be somewhat less than ½f for that particular frequency "f". The inverter outputs couple through diodes 164, 174, 184, 194 to inductors 165, 175, 185, 195 which together with resonating capacitors 166, 176, 186, 196 form tuned circuits operative at, as shown, four different output frequencies. In the cited example, output BA is 55-kilohertz, output BB is 110-kilohertz, output BC is 220-kilohertz, and output BD is 440-kilohertz.

With the exampled suprafrequency BD beat rates, the nominal first search oscillator frequency AA is on the order of 55-kilohertz, say 55.9-kilohertz. The result is a nominal 400 hertz tone at the output of the mixer consisting of MOS-FET device 120, say R.C.A. type 40841, including gate capacitors 109A, 109B, 201, and gate leaks 110, 202. Mixer mode bias is provided by source resistor 121, and bypass 122. An audio filter, including inductor 124 (usually a radio frequency choke) and capacitors 123, 125 serves to admit only the mixer difference frequencies to a comparator 210, say R.C.A. type CA3140, which includes FET drain resistor 126, set resistors 211, 212 and gain set capacitor 215 together with integrating resistor 213 and capacitor 214. The comparator output is a succession of pulses coupled to an inverter 220, say CD4069B. The conditioned output of the inverter drives a capacitor 221 and resistor 222 which serve to differentiate and thereby standardize the pulses produced by the comparator 210 actions. Together with a recovery diode 223, the differentiated pulses couple to inverter 225 the output of which couples to an input on each two input OR gate 230, 235. A switching action, in the manner of diplexing, is produced by coupling a fourteen stage counter 130, e.g., a CD-4020A or the like, clock CK input to the Q output of flip-flop 190. The result is the Q14 output 131 produces a 3.357 hertz square-wave signal which can effectively alternate TURN-OFF of search oscillator transistor 105A, or 105B. This is attained when the output of inverter 145 is logic HIGH. The result is the diode 146 will conduct and effectively CLAMP, or spoil, the oscillations otherwise appearing on the gate of transistor 105A. Conversely when the gate 145 output is logic LOW, the diode 146 which may be a 1N914 or the like is back biased, thereby having nil effect on oscillator operation.

In a like way, the invertor 140 output couples through diode 141 to inhibit, or else enable, oscillator transistor 105B.

Since inverter 140 is driven directly from the Q14 output from counter 130, whereas inverter 145 is driven from the output of yet another inverter 135, the effective result is the alternate gating of oscillator AA or else oscillator AB in rapid sequence, e.g. at 3.357 hertz in this example. The result is alternate search frequencies coupled to the gate of mixer 120 and in due course, a series of alternant difference frequencies at the output of inverter 225 as coupled to OR gates 230, 235.

The other inputs of each OR gates 230, 235 receive alternant 3.357 hertz signals: directly from the counter Q14 for gate 235, and inverted by way of inverter 135 for gate 230. The result is an effective separation of the composite difference frequency rates on the inverter 225 output, which represent the difference between the alternating search frequency oscillator rates and the suprafrequency beat oscillator rate, into two separate output channels: one being that at the output of gate 230, whilst the other is the output of gate 235.

The separated output from gate 230 serves to drive a transistor 240 through a base resistor 231. The collector of the transistor connects through a volume limiting, e.g. current limiting, resistor 241 to a first earphone 50".

The separated output from gate 235 serves to drive a transistor 245 through a base resistor 236. The collector of the transistor connects through a volume limiting resistor 246 to a second earphone 55".

Earphones 50", 55" comprise a biphonic, viz stereophonic type, headset which is worn by an operator such that if the loop 100A is considered the RIGHT loop antenna, then earphone 50" ought to be worn about the operator's right ear. Therefore loop 100B becomes the LEFT antenna, and earphone 55" is adapted to the operator's left ear.

Figure 8:
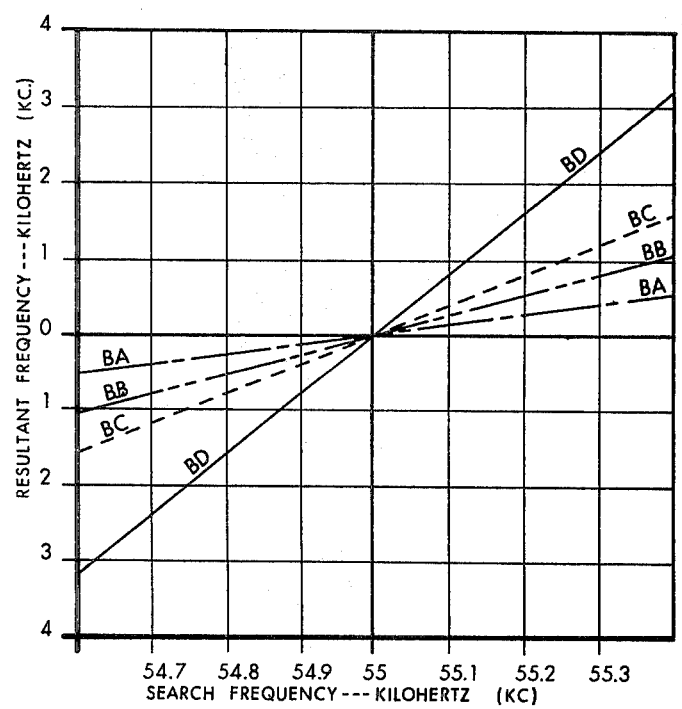
FIG. 8—Plot showing the resultant product frequency change vs search frequency change for several combinations of beat suprafrequency.

FIG. 8 is a plot which graphically shows the resultant frequency, viz audio frequency tone, produced by the mixer when combining the various search frequencies with any one of the several beat frequencies. Plot BA shows the resultant frequency when BA=55-kilohertz, which shows that the output changes in DIRECT proportion to the change in search frequency. Plot BB shows the resultant frequency when BB=110-kilohertz, which shows that the output changes TWICE as much as the search frequency deviation. Accordingly, plot BC for 220-kilohertz, and plot BD for 440-kilohertz show the resultant frequency to change, respectively, FOUR and EIGHT times as much as the 55-kilohertz search frequency deviation.

Figure 9:
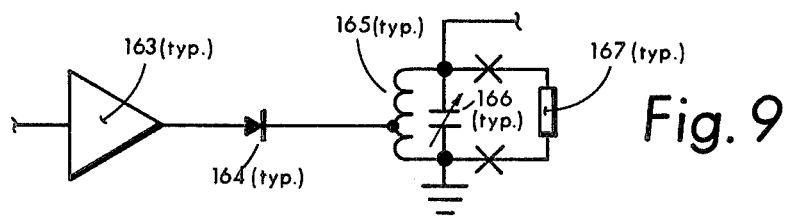
FIG. 9—Circuit detail for one form of frequency conditioning means including loading resistor for amplitude compensation through circuit "Q" adjustment.

FIG. 9 ia a partial detail for the embodiment shown in FIG. 7 wherein a resistor 167 is shown to load the tuned circuit so as to adjust, or compensate, the operating "Q" and thereby the amplitude thereof for each suprafrequency output, so as to be the correct level for proper mixer action in the hetrodyne detector.

Figure 10:
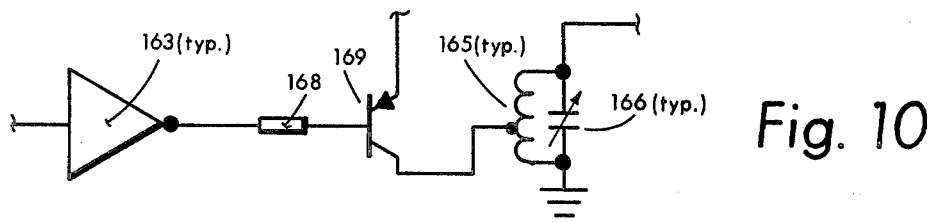
FIG. 10—Circuit detail for driver using transistor collector coupling to tuned coil.

FIG. 10 shows the use of a transistor 169, together with base resistor 168, in lieu of diode 164 for the purpose of exciting the resonant tank circuit 165, 166. The buffer 163 is shown to be an inverting buffer, say CD4049, in this configuration.

Figure 11:
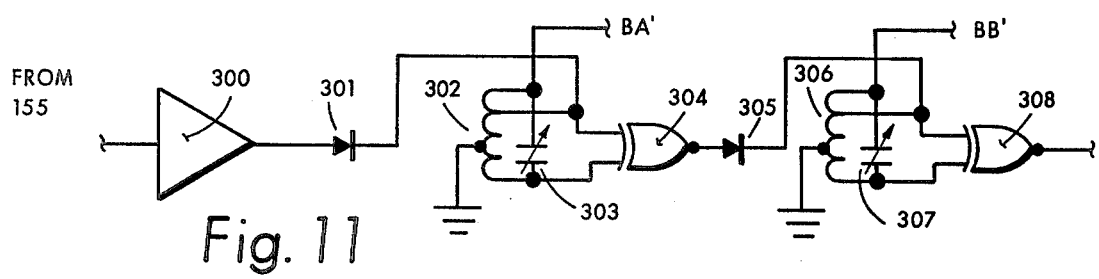
FIG. 11—Frequency doubler means using unique characteristics of exclusive-NOR logic function for drive pulse doubling.

FIG. 11 shows a preferred beat frequency multiplier circuit, wherein the clock frequency is caused to excite a resonant tank circuit 302, 303 through buffer 300 and steering diode 301. The characteristic of the tank circuit is such as to "ring", or else to cause a swing of the EXCLUSIVE-OR-gate 304 two inputs about ground. The effect is to cause two output pulses from the gate 304 output for each cycle of the tank circuit. Whilst not shown, resistors of, say about, 15,000 ohms in series with each gate 304 input can improve performance even further through the isolation of the usual protective diodes, or like means, inherently built into gate devices such as 304. Gate 304 output excites resonant tank 306, 307 through steering diode 305, the result of which is to produce pulses at the output of gate 308. The effect is to produce a frequency "f" on line BA', and a frequency "2f" on line BB', when the tank 302, 303 is tuned to "f", and tank 306, 307 is tuned to "2f", with "f"=clock frequency=search frequency (approximately).

Figure 12:
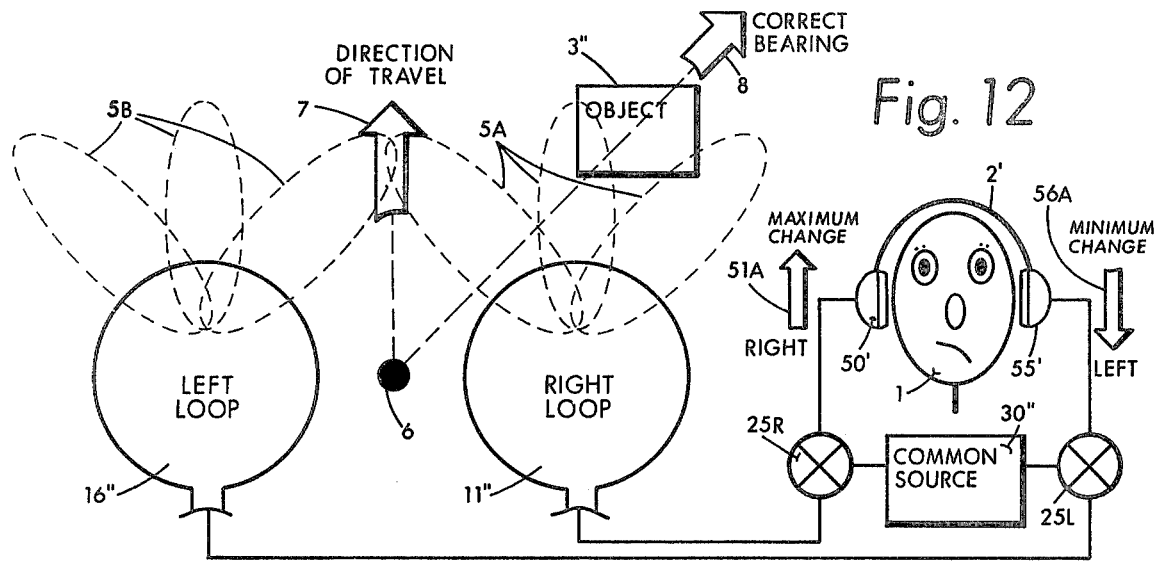
FIG. 12—Interaction between operator's response and object when object is to the right of direction of travel for the detector.
Figure 13:
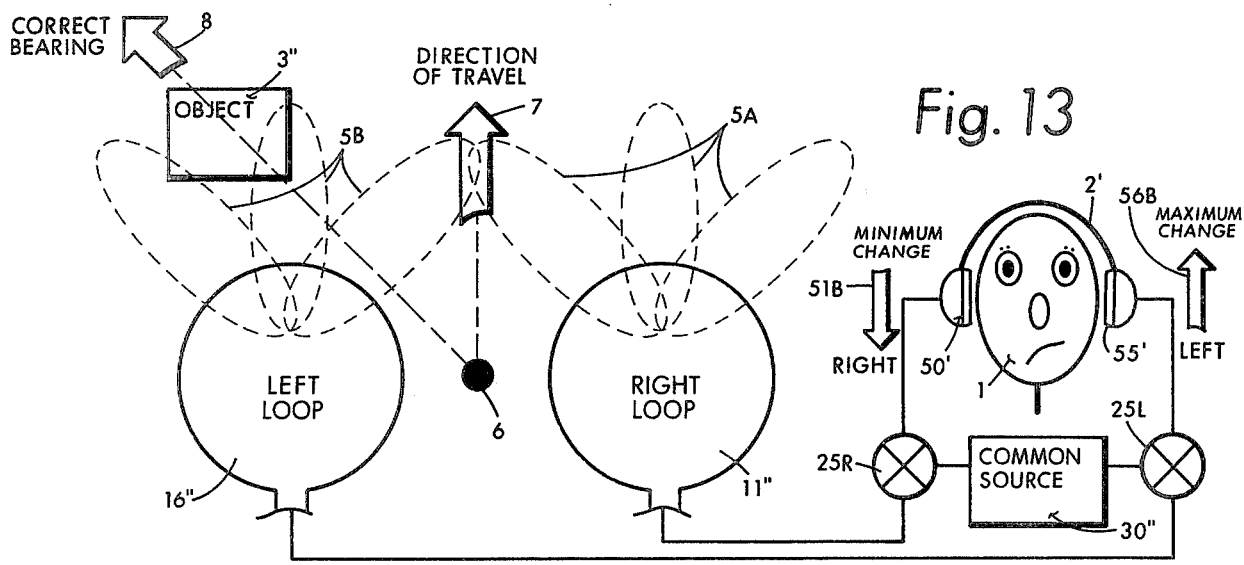
FIG. 13—Interaction between operator's response and object when object is to the left of direction of travel for the detector.
Figure 14:
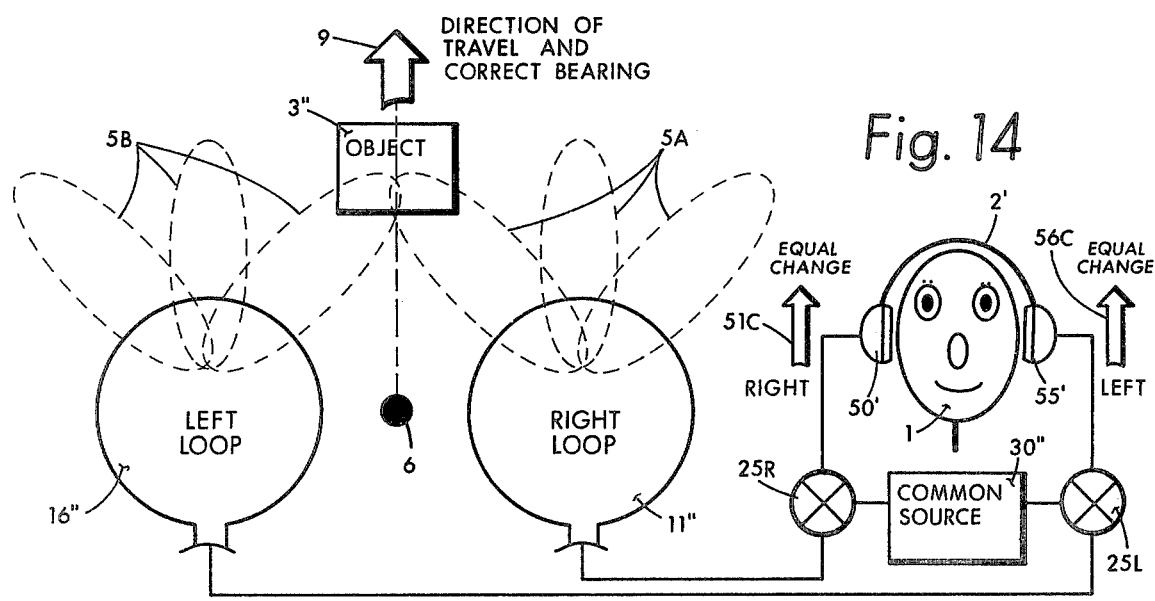
FIG. 14—Balanced indicant response received by operator when object lay is also along the direction of travel.

The directional response of the locator is shown in FIGS. 12, 13, and 14. When, as shown in FIG. 12, the object 3" is to the RIGHT of the direction of travel 7 of the effective center 6 for the antennae group including at least a right loop 11" and a left loop 16", the field lines 5A from the RIGHT loop 11" will serve to interact with the object 3". In contrast, the field lines 5B from the left loop will interact to a much lessor extent, if not at all, with the object 3". The resultant loop signals, which are produced by a coactive oscillator (e.g., the search oscillator 10, 15 as in FIG. 1), couple each to a separate acting mixer function 25R, 25L. The mixer heterodynes the so-coupled search frequency signals with a common source 30" of suprafrequency beat signal. The result is at least a pair of difference frequency signals, one of which is each coupled to a right earphone 50' and a left earphone 55'. The earphones serve to comprise a stereophonic-like headset 2' worn by an operator 1. The interaction of the RIGHT loop 11" with the object 3" results in a measureable pertubation of the search frequency rate reaching the mixer 25R input port. On the other hand, the search signal rate pertubation produced at the left mixer 25L input will be slight, as the coupling between the left loop and the object is small. The result is an indicant signal 51A which exhibits a maximum change to the operator's right earphone 50', whilst little change 56A will occur in the left earphone signal. This imbalance of change telltales the proximateness of the right loop with the object. This sense of imbalance is utilized by the operator's intelligence to localize the correct bearing 8 direction relative to the previous direction of travel 7.

The object 3" is localized to the LEFT of the direction of travel in FIG. 13. What happens is the LEFT loop field lines 5B will interact with the object to a greater extent than the right loop field lines 5A, making for a larger, or maximum change 56B, in the left earphone 55' response and a lessor, if any, change in the right earphone 50' response. This imbalance of response serves to interact with the operator's intelligence to deduce the correct bearing 8 as being to the left of the previous direction of travel 7.

When the correct bearing and the direction of travel coincide, usually being the case when the object 3" lays along the direction of travel 9, the two loops 11", 16" will have their field lines 5A, 5B affected in a similar way by the object 3". The result is a nearly balanced, similiar or equal change 51C, 56C in each earphone 50', 55'. The change will, of course, maximize as the operator approaches the object 3", or conversely the change will diminish as the operator retreats from the object lay. This effect gives the operator at least two important indications:

a. the relative balance between the right and left earphone signals flag the bearing of the object relative to the direction of travel; and,
b. the rate of increase (or decrease) of the telltale signal indicates the relative approach to, or withdrawal from, the position of the object.

Therefore the operator can gain a fix on the location of the object as to at least bearing and direction with a minimum of wasted motion, effort, or time.

Whilst I have detailedly described the instant invention as apparatus particularly suited for the locating of a metal, or metal like, object in soil or like concealment, this description serves merely to illustrate utility for my invention and shall not serve to limit the use of my invention for any application what-so-ever wherein an indicant frequency is produced which is the difference between two higher frequencies wherein further at least one of the higher frequencies varies in accordance with a stimuli.

What I claim is:

1. A directional beat frequency concealed metal object detector apparatus adapted usually as a means for sensing the presence of an object, establishing the effectively right or left bearing of the object relative to the detector, and accurately spotting the location of the concealed object, said apparatus comprising:

a. plural exploratory loop antennae means, including at least an effectively right hand antenna element and an effectively left hand antenna element;
   b. plural search signal oscillator means, having each oscillator thereof effectively coupled to but one of the said antenna elements;
   c. suprafrequency signal generative means for providing at least one common prime frequency, say beat frequency, signal therefrom which exhibits a recurrent periodicity which approximates a greater than one integral multiple of any of the said search signal fundamental periodicities;
   d. Heterodyne detector, say mixer, means providing a first input port means coupled in an effectively separate and alternate way to each said search oscillator means and having an effectively common second input port means coupled to said suprafrequency generative means, operative so as to provide at an output port therefrom a plurality of difference frequency signals the individual periodicities of which are proportional to the difference between a harmonic frequency of each of the said search signal oscillator means and the said common prime frequency provided by the said suprafrequency generative means;
   e. amplifier means coupled to said mixer output port means, whereby said amplifier means is responsive to said difference frequency signal;
   f. plurality indicant means alternately coupled to said plural amplifier means so as to provide at least two separate, say right and left, difference frequency signals therefrom, the periodicity of each which changes in hertz at a rate which is at least two times as great in hertz relative to that of any individual search frequency signal oscillator change, say diviation in herzt; and,
   g. d.c. power source operatively connected to each said oscillator means, suprafrequency generative means, mixer means, and amplifier means.

2. Detector apparatus as in claim 1 wherein each said antenna element serves, at least in part, as a cooperative frequency determining inductance for the coactive said search frequency signal oscillator means, wherein further, any change in the effective said loop said inductance as may be caused by the presence of a metal object in the said loop inductive field will cause a deviation in the said search oscillator frequency.

3. Detector apparatus as in claim 1 wherein said suprafrequency signal generative means provides a plurality of common prime frequency signals, each of which approximate a different greater than one integral multiple of any of the said search signal frequencies, including selector means for connecting any one of the said plural prime frequencies to the said mixer second input port means.

4. Detector apparatus as in claim 1 wherein the ratio between the change in periodicity of each separate said difference frequency signal in hertz and the deviation of each respective said search oscillator frequency in hertz is directly proportional to the ratio between said suprafrequency said common prime frequency and said search oscillator fundamental frequency.

5. Detector apparatus as in claim 1 wherein the said suprafrequency generative means includes a clock oscillator operating at a higher order integral multiple of said search signal frequency wherein further and thereto coupled frequency divider means operates to provide said common prime frequency signal being submultiple of the said clock oscillator frequency.

6. Detector apparatus as in claim 1 wherein said suprafrequency signal generative means includes a plurality of common prime frequency outputs wherein each said output includes an operatively tuned resonant circuit consisting of at least an inductor and a capacitor, the purposeful effect of which is to maximize the individual output signal frequency waveforms.

7. A directional beat frequency concealed metal object detector apparatus adapted usually as a means for sensing the presence of an object, establishing the effectively right or left bearing of the object relative to the detector, and accurately spotting the location and lay of the concealed object, said apparatus comprising a. suprafrequency signal generative means;
   b. a plurality of search frequency signal oscillator means, the individual fundamental periodicities of which are substantially that of an integral submultiple of the common said suprafrequency signal recurrence;
   c. a plurality of exploratory loop antennae means comprised of at least two substantially separate acting loop antenna elements, say right and left responsive, as oriented relative to the principal detector axis, whereby each separate said loop antenna couples substantially to but one of the said search frequency signal oscillator means;

d. heterodyne detector, say mixer, means consisting of at least one first input port means, a second input port means, and an output port means, wherein further said first input port means is coupled in a separate and alternate way to each said search frequency signal oscillator means, said second input port means is coupled to said suprafrequency signal generative means, whereby said mixer is operative to produce at said output port means a plurality of difference frequency signals the individual rates of which are proportional to the difference between the common said suprafrequency signal and a harmonic frequency of each of the said search frequency signal oscillator means;

e. audio amplifier means coupled to said mixer output port means and responsive to said difference signal;

f. plural indicant means coupled alternately to said plural amplifier means so as to provide at least two separate, say right and left, audible sensory signals therefrom, the pitch of each which changes in hertz at a rate which is proportionally at least two times as great in hertz relative to that of any individual search frequency signal oscillator change in hertz; and, g. d.c. power source operatively connected to each said oscillator means, suprafrequency generative means, mixer means, and amplifier means.

8. Detector apparatus as in claim 7 wherein said suprafrequency signal generative means includes a clock oscillator, operative at a frequency which is a substantial multiple of the said search frequency, and a progression of binary, say divide-by-two, counter circuit means at least one output of which is operative to provide a common prime signal for the said mixer second input port.

9. Detector apparatus as in claim 7 wherein said plural search oscillator means consists of two independent search oscillators, each of which includes a separate exploratory loop antenna means which serves to independently act in a separate way upon a concealed metal object;

wherein said two search oscillators each operate at similar yet independently controlled frequencies; wherein said two search oscillators serve to combine in an alternative manner at said input port means of said mixer;

wherein an effectively common said suprafrequency signal connects to said mixer said second input port means; wherein said mixer is operative to produce at said output port means at least two difference signals, one of which represents the difference between the first of the two said search frequencies and the effectively common said suprafrequency, the second of which represents the difference between the second of the two said search frequencies and the effectively common and suprafrequency; wherein said difference frequencies are independently amplified and serve to alternatively couple one of the said difference frequencies to one audible indicant means, whilst the second said difference frequency couples to a second audible indicant means.

10. Detector apparatus as in claim 7 wherein said plural indicant means is effected by a stereophonic headset comprising at least a right earphone and a left earphone.

11. Detector apparatus as in claim 7 wherein said separate acting loop antenna elements are adapted to each respond to the concealed object substantially along the same coactive field plane while with effectively separate field axes orientation relative to the said object.

* * * * *